US010935782B2

(12) United States Patent
Zhang (10) Patent No.: US 10,935,782 B2
(45) Date of Patent: Mar. 2, 2021

(54) DISPLAY APPARATUS, ASSEMBLY FOR ADAPTIVELY MODULATING DISPLAY CONTRAST OF DISPLAY APPARATUS, AND METHOD OF ADAPTIVELY MODULATING DISPLAY CONTRAST OF DISPLAY APPARATUS (71) Applicants: BOE Technology Group Co., Ltd., Beijing (CN); Beijing BOE Display Technology Co., Ltd., Beijing (CN)

(72) Inventor: Kan Zhang, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 228 days.

(21) Appl. No.: 16/302,562

(22) PCT Filed: Dec. 14, 2017

(86) PCT No.: PCT/CN2017/116196
§ 371 (c)(1),
(2) Date: Nov. 16, 2018

(87) PCT Pub. No.: WO2019/113892
PCT Pub. Date: Jun. 20, 2019

(65) Prior Publication Data
US 2020/0124841 A1 Apr. 23, 2020

(51) Int. Cl.
*G02B 26/02* (2006.01)
*G02B 26/08* (2006.01)
(Continued)

(52) U.S. Cl.
CPC ............ *G02B 26/02* (2013.01); *G02B 26/085* (2013.01); *G09G 3/3258* (2013.01); *G09G 3/346* (2013.01);
(Continued)

(58) Field of Classification Search
CPC .................. G02B 26/02; G02B 26/085; G02B 2027/0118; G02B 26/12; G09G 3/3258;
(Continued)

(56) References Cited

U.S. PATENT DOCUMENTS

2007/0121192 A1   5/2007   Lee et al.
2009/0121992 A1   5/2009   Asao et al.
(Continued)

FOREIGN PATENT DOCUMENTS

CN   101029965 A   9/2007
CN   101551977 A   10/2009
(Continued)

OTHER PUBLICATIONS

International Search Report & Written Opinion dated Sep. 7, 2018, regarding PCT/CN2017/116196.
(Continued)

*Primary Examiner* — Robert E. Tallman
(74) *Attorney, Agent, or Firm* — Intellectual Valley Law, P.C.

(57) ABSTRACT

The present application discloses a display apparatus. The display apparatus includes a display panel having a plurality of subpixels; and an array of a plurality of micro light modulators on the display panel and configured to adaptively modulate display contrast of the display apparatus. Each of the plurality of micro light modulators is configured to adaptively modulate a light intensity of light emitted out of a light emitting side of the display panel in a region corresponding to each of the plurality of micro light modulators based on a luminance level of a current image displayed in the region.

19 Claims, 7 Drawing Sheets (51) Int. Cl.
*G09G 3/34* (2006.01)
*G09G 3/3258* (2016.01)

(52) U.S. Cl.
CPC ............... *G09G 2310/0291* (2013.01); *G09G 2320/066* (2013.01); *G09G 2360/14* (2013.01)

(58) Field of Classification Search
CPC ........... G09G 3/346; G09G 2310/0291; G09G 2320/066; G09G 2360/14
See application file for complete search history.

(56) References Cited

U.S. PATENT DOCUMENTS

| | | | |
|---|---|---|---|
| 2009/0128878 A1* | 5/2009 | Jun | G02B 26/105 359/199.3 |
| 2009/0251056 A1 | 10/2009 | Cho | |
| 2010/0149469 A1 | 6/2010 | Hunt | |
| 2012/0013972 A1 | 1/2012 | Gibson et al. | |
| 2014/0192078 A1 | 7/2014 | Gilbert | |
| 2015/0241725 A1 | 8/2015 | Zhuang et al. | |

FOREIGN PATENT DOCUMENTS

| | | |
|---|---|---|
| CN | 201689258 U | 12/2010 |
| CN | 102246090 A | 11/2011 |
| CN | 102576163 A | 7/2012 |
| EP | 2748810 A1 | 7/2014 |
| KR | 20080112439 A | 12/2008 |
| KR | 101263511 B1 | 5/2013 |
| WO | 2005111706 A1 | 11/2005 |
| WO | 2015127022 A1 | 8/2015 |
| WO | 2016048702 A1 | 3/2016 |

OTHER PUBLICATIONS

Notice of Grant of Patent in the Korean Patent Application No. 20187034679, dated May 25, 2020; English translation attached.
First Office Action in the Indian Patent Application No. 201847045080, dated Jul. 10, 2020.

* cited by examiner

DISPLAY APPARATUS, ASSEMBLY FOR ADAPTIVELY MODULATING DISPLAY CONTRAST OF DISPLAY APPARATUS, AND METHOD OF ADAPTIVELY MODULATING DISPLAY CONTRAST OF DISPLAY APPARATUS

CROSS-REFERENCE TO RELATED APPLICATION

This application is a national stage application under 35 U.S.C. § 371 of International Application No. PCT/CN2017/116196, filed Dec. 14, 2017, the contents of which are incorporated by reference in the entirety.

TECHNICAL FIELD

The present invention relates to display technology, more particularly, to a display apparatus, an assembly for adaptively modulating display contrast of a display apparatus, and a method of adaptively modulating display contrast of a display apparatus.

BACKGROUND

Display apparatuses such as liquid crystal display (LCD) apparatuses and organic light-emitting diode (OLED) display apparatuses have been widely used. LCD and OLED display devices use thin film transistor (TFT) to control pixels in the display panel.

SUMMARY

In one aspect, the present invention provides a display apparatus comprising a display panel having a plurality of subpixels; and an array of a plurality of micro light modulators on the display panel and configured to adaptively modulate display contrast of the display apparatus; wherein each of the plurality of micro light modulators is configured to adaptively modulate a light intensity of light emitted out of a light emitting side of the display panel in a region corresponding to each of the plurality of micro light modulators based on a luminance level of a current image displayed in the region.

Optionally, the region corresponding to each of the plurality of micro light modulators comprises one or more of the plurality of subpixels.

Optionally, the display panel has a first side distal to the array of a plurality of micro light modulators, and a second side opposite to the first side and proximal to the array of a plurality of micro light modulators; and each of the plurality of micro light modulators is configured to adaptively modulate a first light intensity of first light emitted out of the first side of the display panel in a region corresponding to each of the plurality of micro light modulators based on a second light intensity of second light emitted out of the second side of the display panel in the region corresponding to each of the plurality of micro light modulators.

Optionally, the first light intensity positively correlates with the second light intensity.

Optionally, each of the plurality of micro light modulators is configured to adaptively modulate the first light intensity of the first light by reflecting a first portion of the second light toward the second side thereby increasing the first light intensity.

Optionally, each of the plurality of micro light modulators is configured to reflect a second portion of the second light along a direction away from the second side.

Optionally, the display apparatus further comprises an adaptive control circuit configured to adaptively adjust a ratio of the first portion to the second portion in response to a change in the second light intensity thereby adaptively modulating the first light intensity based on the second light intensity.

Optionally, each of the plurality of micro light modulators further comprises a photosensor configured to detect the second portion of the second light.

Optionally, a resistance of the photosensor undergoes a change in response to the change in the second light intensity, and the adaptive control circuit is configured to adaptively adjust the ratio of the first portion to the second portion in response to a change in the resistance of the photosensor.

Optionally, the display apparatus further comprises a plurality of first scan lines each of which coupled to a row of micro light modulators of the plurality of micro light modulators; a plurality of second scan lines each of which coupled to a column of micro light modulators of the plurality of micro light modulators; and a plurality of switch transistors each of which having a source coupled to one of the plurality of first scan lines, a gate coupled to one of the plurality of second scan lines, and a drain coupled to the photosensor in one of the plurality of micro light modulators.

Optionally, the plurality of first scan lines are a plurality of gate lines for driving image display in a plurality of subpixels in the display apparatus.

Optionally, the plurality of second scan lines are a plurality of gate lines for driving image display in a plurality of subpixels in the display apparatus.

Optionally, the adaptive control circuit comprises a differential amplifier configured to generate a voltage control signal in response to the change in the resistance of the photosensor.

Optionally, the adaptive control circuit further comprises a first transistor having a gate coupled to the differential amplifier and a source configured to be provided with a ramp voltage having a repetition frequency; a capacitor having a first electrode coupled to a drain of the first transistor; and a second transistor having a gate coupled to the first electrode of the capacitor, a source configured to be provided with a control voltage; wherein a voltage level maintained at the first electrode of the capacitor is configured to control a current passing through the source and a drain of the second transistor.

Optionally, the repetition frequency is substantially the same as a frame frequency of image display in the display panel.

Optionally, the voltage control signal is configured to turn off the first transistor so that the ramp voltage discontinues to charge the capacitor, when the resistance of the photosensor is within a range of reference resistance values.

Optionally, each of the plurality of micro light modulators comprises a micro mirror; the micro mirror has a reflective surface at a first angle with respect to a surface of the second side of the display panel; the reflective surface is configured to reflect a first portion of the second light toward the second side and the second portion of the second light along a direction away from the second side; and the display apparatus further comprises an adaptive control circuit configured to control the first angle to adaptively adjust a ratio of the first portion to the second portion in response to a change in the second light intensity thereby adaptively modulating the first light intensity based on the second light intensity.

Optionally, each of the plurality of micro light modulators further comprises an actuator configured to control the first angle of the reflective surface with respect to the surface of the second side of the display panel.

Optionally, the actuator is an electromagnetic coil; and each of the plurality of micro light modulators includes a magnet attached to the micro mirror; wherein a magnitude of a magnetic force between the electromagnetic coil and the magnet controls the first angle.

Optionally, each of the plurality of micro light modulators further comprises a hinge coupled to the micro mirror; and the micro mirror is configured to rotate with respect to the hinge in response to a change in the magnetic force thereby changing the first angle.

Optionally, the display panel is a transparent display panel.

In another aspect, the present invention provides an assembly for adaptively modulating display contrast of a display panel, comprising an array of a plurality of micro light modulators; wherein each of the plurality of micro light modulators is configured to adaptively modulate a light intensity of light emitted out of a light emitting side of the display panel in a region corresponding to each of the plurality of micro light modulators based on a luminance level of a current image displayed in the region.

In another aspect, the present invention provides a method of adaptively modulating display contrast of a display panel, comprising adaptively modulating a light intensity of light emitted out of a light emitting side of the display panel in a region corresponding to each of the plurality of micro light modulators based on a luminance level of a current image displayed in the region.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional display panels, in particular transparent display panels, the display contrast deteriorates when the ambient light intensity is relatively high, e.g., in an outdoor environment or when the display panel is a transparent display panel. This makes it difficult for the readers to view the displayed image. Readers may increase the brightness of the outdoor display panel in order to view the image display better. However, this leads to much higher power consumption.

Accordingly, the present disclosure provides, inter alia, a display apparatus, an assembly for adaptively modulating display contrast of a display apparatus, and a method of adaptively modulating display contrast of a display apparatus that substantially obviate one or more of the problems due to limitations and disadvantages of the related art. In one aspect, the present disclosure provides a display apparatus including a display panel having a plurality of subpixels, and an array of a plurality of micro light modulators on the display panel and configured to adaptively modulate display contrast of the display apparatus. In some embodiments, each of the plurality of micro light modulators is configured to adaptively modulate a light intensity of light emitted out of a light emitting side of the display panel in a region corresponding to each of the plurality of micro light modulators based on a luminance level of a current image displayed in the region.

As used herein, the term "adaptively" refers to capability of changing so as to become suitable to a new set of conditions, e.g., modulations or adjustments that are dynamic and subject to automatic change based on feedback from one or more acquired inputs or detected conditions. In one example, the light intensity of the light emitted out of the light emitting side of the display panel in a certain region can be adaptively modulated based on feedback from a luminance level of a current image displayed in the region. By adaptively modulating the light intensities in a plurality of regions, the display contrast of the display apparatus can be adaptively modulated.

Figure 1:
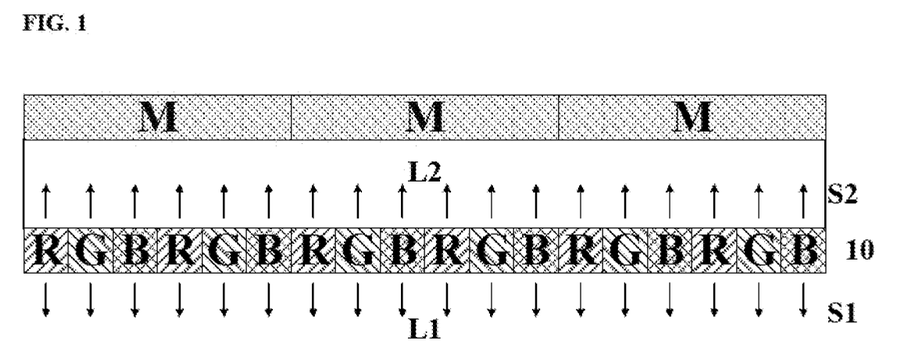
FIG. 1 is a schematic diagram illustrating the structure of a display apparatus in some embodiments according to the present disclosure.

FIG. 1 is a schematic diagram illustrating the structure of a display apparatus in some embodiments according to the present disclosure. Referring to FIG. 1, the display apparatus in some embodiments includes a display panel 10 and an array of a plurality of micro light modulators M on the display panel 10. The plurality of micro light modulators M are configured to adaptively modulate display contrast of the display apparatus. Each of the plurality of micro light modulators M is configured to adaptively modulate a light intensity of light emitted out of a light emitting side of the display panel 10 in a region corresponding to each of the plurality of micro light modulators M based on a luminance level of a current image displayed in the region. Optionally, light intensities in the plurality of regions are not uniformly modulated. Optionally, the plurality of micro light modulators M are configured to adaptively modulate light intensities of light emitted out of the light emitting side of the display panel 10 in a plurality of regions corresponding to the plurality of micro light modulators M such that light intensities in regions having higher luminance levels are increased to a greater extent (e.g., by a larger percentage) as compared to light intensities in regions having lower luminance levels. By having this design, the display contrast of the image displayed in the display panel 10 can be significantly enhanced. Because the modulation is performed adaptively and is based on the luminance level of the current image displayed in the region, the light intensity modulation is a dynamic process. For example, in the next frame of image, the luminance level in the same region is decreased, the light intensity in the region may be correspondingly increased to a lesser extent or not increased.

Various appropriate light modulators may be used for adaptively modulating the display contrast of the display apparatus and the first light intensity of the first light emitted out of the first side S1 of the display panel 10. Examples of appropriate light modulators include a microelectromechanical system (MEMS), electro-optic type light modulators (e.g., liquid crystal), electromechanical type light modulators, electrochromic type light modulators, reflective light modulators, and other types of light modulators. Examples of MEMSs include micro mirror array systems such as a digital micro-mirror device. Optionally, as described in examples below, the plurality of micro light modulators includes a plurality of micro mirros.

The region corresponding to each of the plurality of micro light modulators includes one or more of the plurality of subpixels. Optionally, each region includes a single subpixel. Optionally, the display panel includes a plurality of pixels, each of which includes multiple subpixels (e.g., a red subpixel, a green subpixel, and a blue subpixel), and each region includes one or more pixels. Optionally, each region corresponding to each of the plurality of micro light modulators includes 1 to 1000 subpixels, e.g., 1 to 100 subpixels, 100 to 200 subpixels, 200 to 300 subpixels, 300 to 400 subpixels, 400 to 500 subpixels, 500 to 600 subpixels, 600 to 700 subpixels, 700 to 800 subpixels, 800 to 800 subpixels, and 900 to 1000 subpixels.

As shown in FIG. 1, in some embodiments, the display panel has a first side S1 distal to the array of a plurality of micro light modulators M, and a second side S2 opposite to the first side S1 and proximal to the array of a plurality of micro light modulators M. Each of the plurality of micro light modulators M is configured to adaptively modulate a first light intensity of first light L1 emitted out of the first side S1 of the display panel 10 in a region corresponding to each of the plurality of micro light modulators M based on a second light intensity of second light L2 emitted out of the second side S2 of the display panel 10 in the region corresponding to each of the plurality of micro light modulators M.

In some embodiments, the first light intensity positively correlates with the second light intensity. Optionally, the increment of the first light intensity over an original value of light intensity of first light L1 emitted out of the first side S1 of the display panel 10 as defined by the luminance level in the current frame of image positively correlates with the second light intensity. Optionally, the higher the light intensity of the second light L2 emitted out of the second side S2 of the display panel 10 in the region in a current frame of image displayed in the region, to a greater extent the first light intensity of first light L1 emitted out of the first side S1 of the display panel 10 in the same region is increased. Optionally, the light intensity of the second light L2 emitted out of the second side S2 of the display panel 10 in the region varies in a range between a maximum value and a minimum value, the first light intensity of first light L1 emitted out of the first side S1 of the display panel 10 in the same region is minimally increased or not increased when the light intensity of the second light L2 is equal to the minimum value, and the first light intensity of first light L1 emitted out of the first side S1 of the display panel 10 in the same region is maximally increased when the light intensity of the second light L2 is equal to the maximum value. Optionally, when the light intensity of the second light L2 emitted out of the second side S2 of the display panel 10 in the region is equal to or less than a first value, the first light intensity of first light L1 emitted out of the first side S1 of the display panel 10 in the same region is not increases. Optionally, when the light intensity of the second light L2 emitted out of the second side S2 of the display panel 10 in the region is equal to or greater than a second value, the first light intensity of first light L1 emitted out of the first side S1 of the display panel 10 in the same region is increased by a maximum value.

Figure 2:
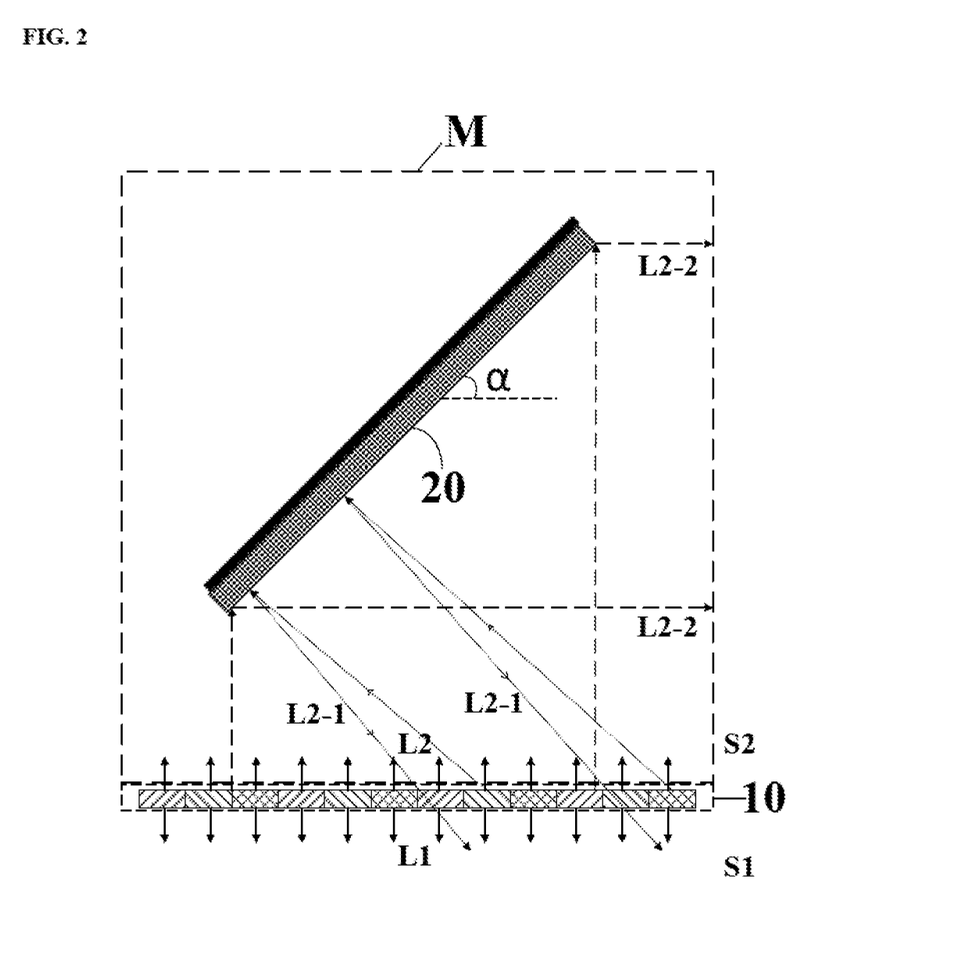
FIG. 2 is a schematic diagram illustrating the working principle of one of the plurality of micro light modulators in a display apparatus in some embodiments according to the present disclosure.

FIG. 2 is a schematic diagram illustrating the working principle of one of the plurality of micro light modulators in a display apparatus in some embodiments according to the present disclosure. Referring to FIG. 2, the one of the plurality of micro light modulators M includes a means (e.g., a micro mirror 20) for reflecting the second light L2 emitted out of the second side S2 of the display panel 10. As shown in FIG. 2, each of the plurality of micro light modulators M is configured to adaptively modulate the first light intensity of the first light L1 by reflecting a first portion L2-1 of the second light L2 toward the second side S2 thereby increasing the first light intensity of the first light L1. Optionally, the first portion L2-1 subsequently transmits through the display panel 10 to the first side S1. Thus, in the context of the present disclosure, the first light L1 in some embodiments includes two components, a first component being light directly emitted from the display panel 10 (e.g., from a light emitting layer or a liquid crystal layer) to the first side S1 of the display panel 10, a second component being the first portion L2-1 of the second light L2 reflected by the one of the plurality of micro light modulators M toward the second side S2 and transmitted through the display panel 10 to the first side S1. The first light intensity of the first light L1 is the combined light intensity of the first component and the second component.

Referring to FIG. 2, in some embodiments, each of the plurality of micro light modulators M is configured to reflect a second portion L2-2 of the second light L2 along a direction away from the second side S2. In one example, the second portion L2-2 is reflected along a direction substantially parallel to the second side S2. In some embodiments, the amount or intensity of the second portion L2-2 is measured, and the measured amount or intensity of the second portion L2-2 is used as feedback for adaptively modulating the first light intensity of the first light L1 emitted out of the first side S1 of the display panel 10, e.g., in a current frame of image.

Various appropriate adaptive feedback mechanisms may be used for adaptive modulation of the first light intensity. For illustration purpose, in some embodiments, the display apparatus includes an adaptive control circuit configured to adaptively adjust a ratio of the first portion L2-1 to the second portion L2-2 in response to a change in the second light intensity thereby adaptively modulating the first light intensity based on the second light intensity. For example, at a first time point in a current frame of image, the second portion L2-2 has a measured amount or intensity greater than a reference value, the adaptive control circuit is configured to control the one of the plurality of micro light modulators M such that the ratio of the first portion L2-1 to the second portion L2-2 is adjusted to lower the measured amount or intensity of the second portion L2-2. In another example, at a second time point in a current frame of image, the second portion L2-2 has a measured amount or intensity less than a reference value, the adaptive control circuit is configured to control the one of the plurality of micro light modulators M such that the ratio of the first portion L2-1 to the second portion L2-2 is adjusted to increase the measured amount or intensity of the second portion L2-2. The adaptive process may be continued until at a third time point the measured amount or intensity of the second portion L2-2 is substantially the same as a reference value (or within a reference range). In another example, the adaptive control circuit is configured to control the one of the plurality of micro light modulators M by adjusting a first angle α between a reflective surface of the micro mirror 20 and a surface of the second side S2 of the display panel 10.

Figure 3:
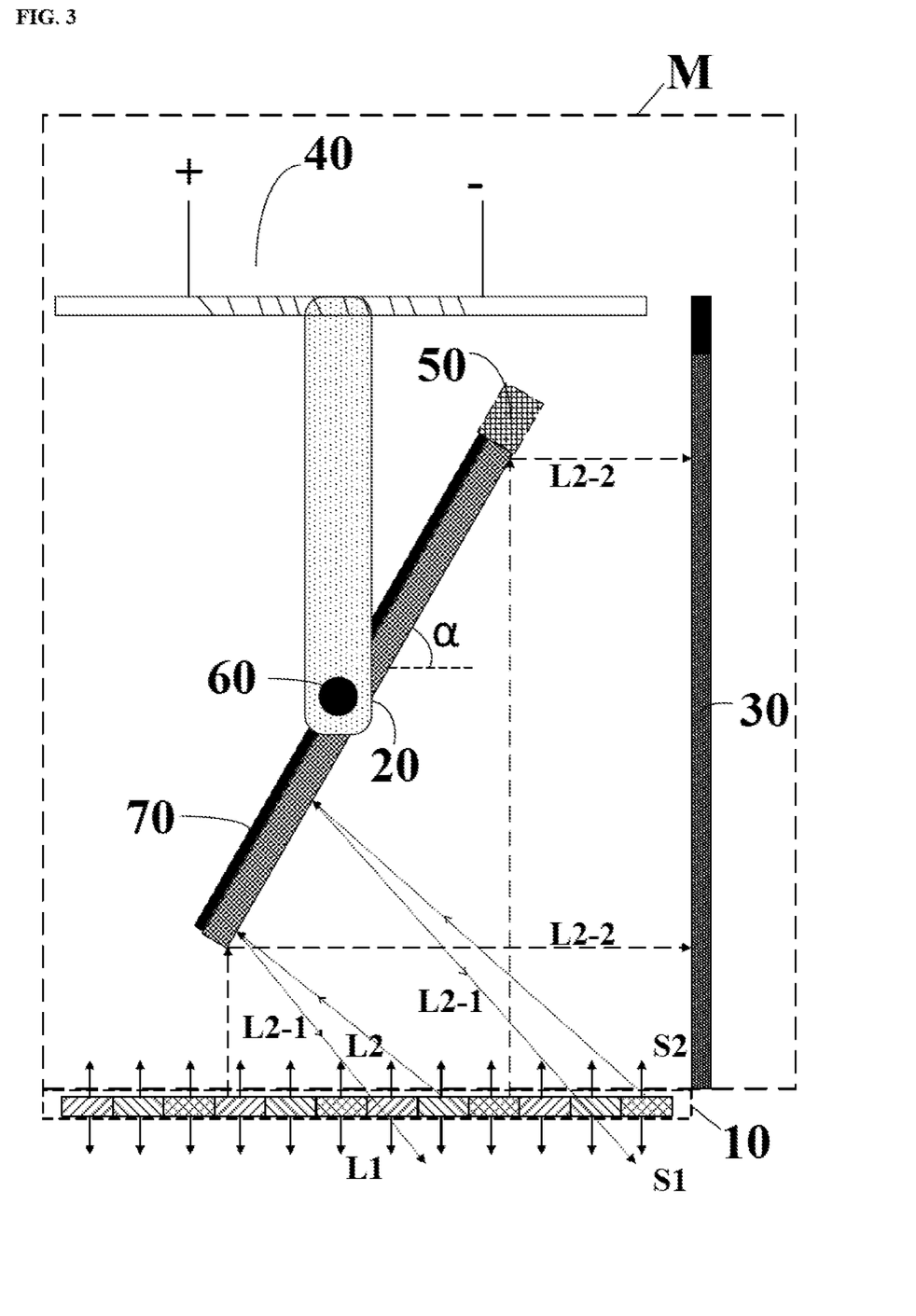
FIG. 3 is a schematic diagram illustrating the working principle of one of the plurality of micro light modulators in a display apparatus in some embodiments according to the present disclosure.

FIG. 3 is a schematic diagram illustrating the working principle of one of the plurality of micro light modulators in a display apparatus in some embodiments according to the present disclosure. Referring to FIG. 3, in some embodiments, each of the plurality of micro light modulators M further includes a photosensor 30 configured to detect the second portion L2-2 of the second light L2. FIG. 3 illustrates an example in which the second light intensity of the second light L2 is relatively small. The adaptive process may be performed (e.g., through an adaptive control circuit) to arrive at a state in which the measured amount or intensity of the second portion L2-2 is substantially the same as a reference value (or within a reference range). Because the second light intensity of the second light L2 is relatively small, the first angle α needs to be adjusted to a relatively large value to achieve this state.

Figure 4:
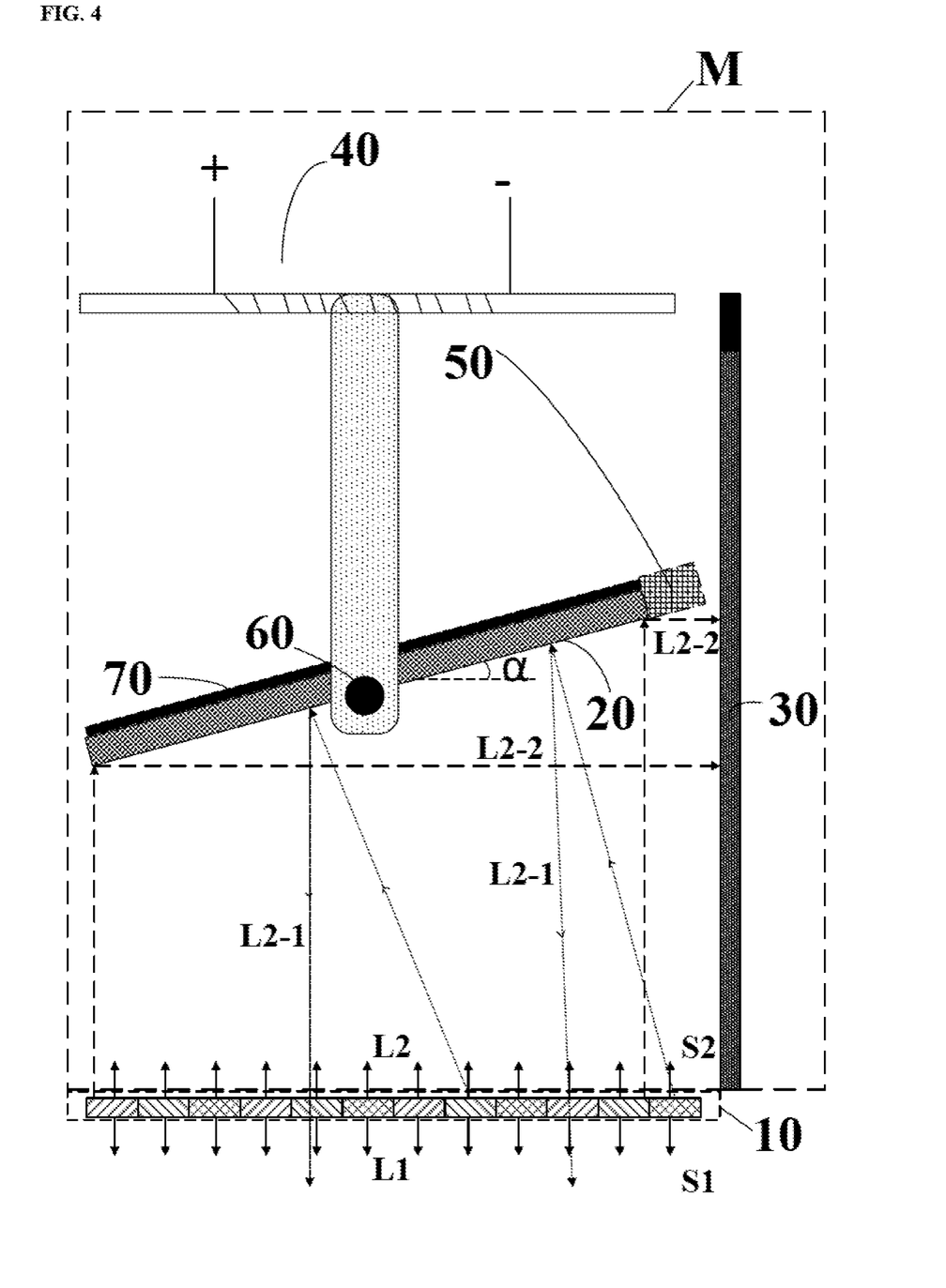
FIG. 4 is a schematic diagram illustrating the working principle of one of the plurality of micro light modulators in a display apparatus in some embodiments according to the present disclosure.

FIG. 4 is a schematic diagram illustrating the working principle of one of the plurality of micro light modulators in a display apparatus in some embodiments according to the present disclosure. FIG. 4 illustrates an example in which the second light intensity of the second light L2 is relatively large. The adaptive process may be performed (e.g., through an adaptive control circuit) to arrive at a state in which the measured amount or intensity of the second portion L2-2 is substantially the same as a reference value (or within a reference range). Because the second light intensity of the second light L2 is relatively large, the first angle α only needs to be adjusted to a relatively small value to achieve this state.

Various appropriate methods and devices may be used for measure the amount or intensity of the second portion L2-2. In one example, the amount or intensity of the second portion L2-2 is measured by a photosensor 30 as shown in FIG. 3 and FIG. 4. Optionally, the photosensor 30 has a resistance RL. In response to a change in the second light intensity of the second light L2 (e.g., from a state as shown in FIG. 3 to a state as shown in FIG. 4, or vice versa), the amount of light received by the photosensor 30 also undergoes a change, which leads to a change in the resistance RL of the photosensor 30.

In one example, the region corresponding to the one of the plurality of micro light modulators M undergoes a change from a state as shown in FIG. 3 to a state as shown in FIG. 4, e.g., from a first state corresponding to a lower luminance level in the region to a second state corresponding to the higher luminance level. At the first time point as shown in FIG. 3, the second light intensity of the second light L2 is substantially the same as a reference light intensity, and the resistance RL of the photosensor 30 is substantially the same as a reference resistance. When the luminance level in the region increases, the second light intensity of the second light L2 correspondingly increases, and the resistance RL of the photosensor 30 correspondingly decreases. The adaptive control circuit is configured to adaptively control the micro mirror 20 so that the first angle α between a reflective surface of the micro mirror 20 and a surface of the second side S2 of the display panel 10 decreases (e.g., to a state as shown in FIG. 4). As the first angle α decreases, the ratio of the first portion L2-1 to the second portion L2-2 increases, e.g., the area of the photosensor 30 irradiated by the second portion L2-2 decreases and the amount of light of the second portion L2-2 decreases. As the amount of light of the second portion L2-2 decreases, the resistance RL of the photosensor 30 increases. The adaptive process continues until the resistance RL of the photosensor 30 increases to a level substantially the same as the reference resistance.

In another example, the region corresponding to the one of the plurality of micro light modulators M undergoes a change from a state as shown in FIG. 4 to a state as shown in FIG. 3. e.g., from a first state corresponding to a higher luminance level in the region to a second state corresponding to the lower luminance level. At the first time point as shown in FIG. 4, the second light intensity of the second light L2 is substantially the same as a reference light intensity, and the resistance RL of the photosensor 30 is substantially the same as a reference resistance. When the luminance level in the region decreases, the second light intensity of the second light L2 correspondingly decreases, and the resistance RL of the photosensor 30 correspondingly increases. The adaptive control circuit is configured to adaptively control the micro mirror 20 so that the first angle α between a reflective surface of the micro mirror 20 and a surface of the second side S2 of the display panel 10 increases (e.g., to a state as shown in FIG. 3). As the first angle α increases, the ratio of the first portion L2-1 to the second portion L2-2 decreases, e.g., the area of the photosensor 30 irradiated by the second portion L2-2 increases and the amount of light of the second portion L2-2 increases. As the amount of light of the second portion L2-2 increases, the resistance RL of the photosensor 30 decreases. The adaptive process continues until the resistance RL of the photosensor 30 decreases to a level substantially the same as the reference resistance.

Figure 5:
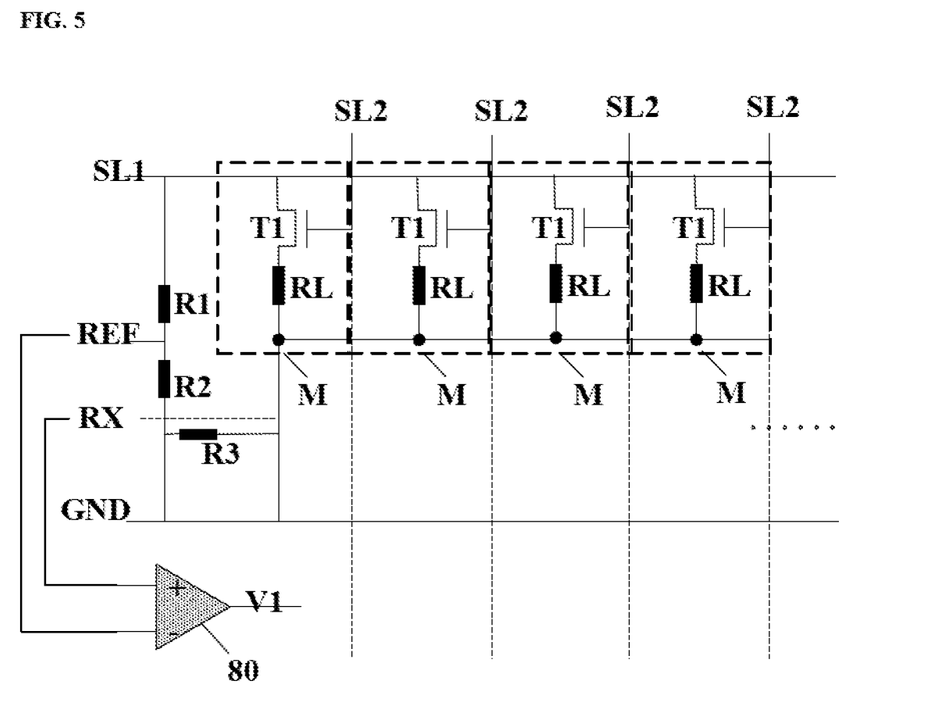
FIG. 5 is a schematic diagram illustrating a plurality of micro light modulators in a display apparatus in some embodiments according to the present disclosure.

FIG. 5 is a schematic diagram illustrating a plurality of micro light modulators in a display apparatus in some embodiments according to the present disclosure. Referring to FIG. 5, the display apparatus in some embodiments includes a plurality of micro light modulators M, each of which includes a photosensor 30. The photosensor 30 has a resistance RL. The display apparatus further includes a plurality of first scan lines SL1, each of which is coupled to a row of micro light modulators of the plurality of micro light modulators M. The display apparatus further includes a plurality of second scan lines SL2, each of which is coupled to a column of micro light modulators of the plurality of micro light modulators M. The display apparatus further includes a plurality of switch transistors T1 (e.g., thin film transistors), each of which having a source coupled to one of the plurality of first scan lines SL1, a gate coupled to one of the plurality of second scan lines SL2, and a drain coupled to the photosensor 30 in one of the plurality of micro light modulators M. In operation, a first scanning signal is provided to the plurality of switch transistors T1 row-by-row, the first scanning signal being provided to the source electrodes of the plurality of switch transistors T1 in one row of micro light modulators of the plurality of micro light modulators M. A second scanning signal is provided to the plurality of switch transistors T1 column-by-column, the second scanning signal being provided to the gate electrodes of the plurality of switch transistors T1 in one column of micro light modulators of the plurality of micro light modulators M. When one of the plurality of switch transistors T1 is turned on by the first scanning signal and the second scanning signal, the resistance RL of the photosensor 30 can be measured (e.g., the amount of light of the second portion L2-2 irradiated on the photosensor 30 can be measured). Optionally, the plurality of first scan lines SL1 are the same as a plurality of gate lines for driving image display in a plurality of subpixels in the display apparatus. Optionally, the plurality of second scan lines SL2 are the same as a plurality of gate lines for driving image display in a plurality of subpixels in the display apparatus.

As shown in FIG. 5, the adaptive control circuit in some embodiments includes a differential amplifier 80 configured to generate a voltage control signal V1 in response to the change in the resistance RL of the photosensor 30. When a reference voltage signal REF is substantially the same as a voltage signal Rx, the voltage control signal V1 is substantially zero. In one example, when RL/R3 is substantially the same as R1/R2, the voltage control signal V1 is substantially zero. When the reference voltage signal REF is different from the voltage signal Rx, the voltage control signal V1 is not zero, and is configured to adaptively control the ratio of the first portion L2-1 to the second portion L2-2, which in turn changes the resistance RL.

Figure 6:
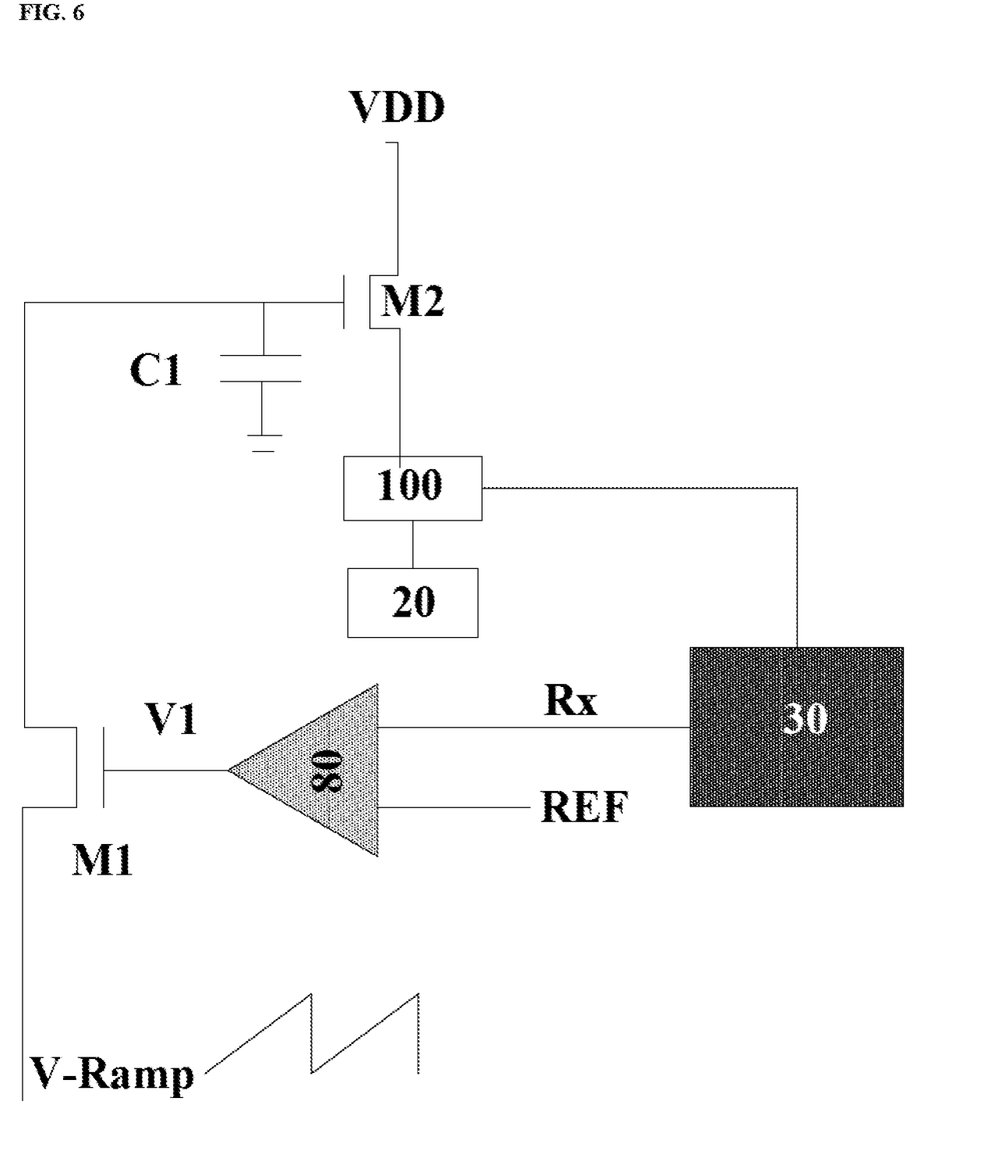
FIG. 6 is a schematic diagram illustrating the structure of an adaptive control circuit in a display apparatus in some embodiments according to the present disclosure.

FIG. 6 is a schematic diagram illustrating the structure of an adaptive control circuit in a display apparatus in some embodiments according to the present disclosure. Referring to FIG. 6, the adaptive control circuit in some embodiments further includes a first transistor M1 having a gate coupled to the differential amplifier 80 and a source configured to be provided with a ramp voltage V-Ramp having a repetition frequency; a capacitor C1 having a first electrode coupled to a drain of the first transistor M1; and a second transistor M2 having a gate coupled to the first electrode of the capacitor C1, a source configured to be provided with a control voltage VDD. A voltage level maintained at the first electrode of the capacitor C1 is configured to control a current passing through the source and a drain of the second transistor M2.

In some embodiments, the photosensor 30 is configured to detect a change in the luminance level in the region corresponding to one of the plurality of micro light modulators M, e.g., by detecting the second light intensity of the second portion L2-2 of the second light as described above. The differential amplifier 80 is configured to provide feedback to the first transistor based on the change of luminance level detected by the photosensor 30. In one example, the differential amplifier 80 outputs a control voltage signal V1 to the gate of the first transistor M1. The source of the first transistor M1 is provided with a ramp voltage V-Ramp. In one example, the control voltage signal V1 has a voltage level greater than a reference voltage level to turn on the first transistor M1. The ramp voltage V-Ramp passes through the first transistor M1 to charge the first electrode of the capacitor C1. Optionally, the second electrode of the capacitor is provided with a ground voltage. The voltage level maintained at the first electrode of the capacitor C1 controls the source-drain resistance of the second transistor M2. e.g., the current passing through the source and the drain of the second transistor M2. The drain electrode of the second transistor M2 is coupled to an actuator 100. In one example, the actuator 100 is configured to control the first angle α of the reflective surface of a micro mirror 20 with respect to the surface of the second side of the display panel 10, which in turn determines the resistance of the photosensor 30. Thus, the level of the current passing through the source and the drain of the second transistor M2 determines the degrees of the first angle α.

In some embodiments, the ramp voltage V-Ramp continues to charge the first electrode of the capacitor C1, the current passing through the source and the drain of the second transistor M2 continues to raise. Consequently, the first angle α of the reflective surface of a micro mirror 20 with respect to the surface of the second side of the display panel 10 continues to change, which leads to a change in the resistance of the photosensor 30. The change in the resistance of the photosensor 30 in turn changes (e.g., decreases) the control voltage signal V1 out of the differential amplifier 80. When the resistance of the photosensor 30 is within a range of reference resistance values (e.g., substantially the same as a reference value), the control voltage signal V1 is configured to turn off the first transistor M1 so that the ramp voltage V-Ramp discontinues to charge the capacitor C1 (e.g., when the voltage level of the control voltage signal V1 is less than a threshold voltage level).

Optionally, the ramp voltage V-Ramp has a repetition frequency. Optionally, the repetition frequency is substantially the same as a frame frequency of image display in the display panel.

Figure 7:
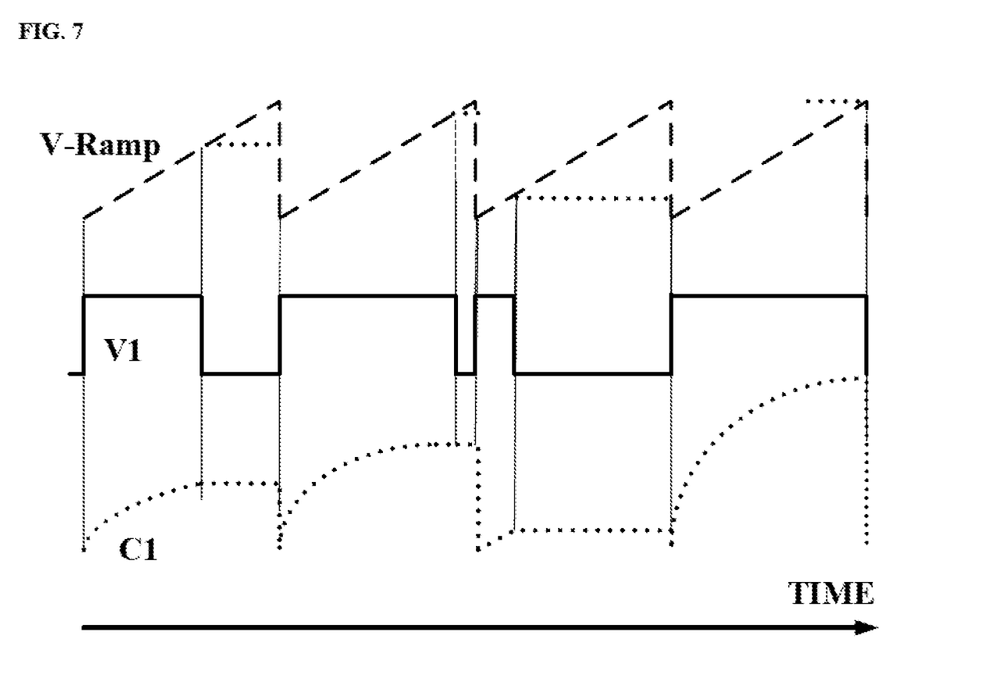
FIG. 7 depicts waveforms of various signals involved in an adaptive control circuit of a display apparatus in some embodiments according to the present disclosure.

FIG. 7 depicts waveforms of various signals involved in an adaptive control circuit of a display apparatus in some embodiments according to the present disclosure. Referring to FIG. 7, the control voltage signal V1 is shown in solid lines, the ramp voltage V-Ramp is shown in long dotted lines, and the voltage maintained at the first electrode of the capacitor C1 is shown in small dotted lines. As shown in FIG. 7, in each cycle of the repetition of the ramp voltage V-Ramp, the ramp voltage V-Ramp continues to raise. The control voltage signal V1 at the beginning of each cycle is at a high level to turn on the first transistor M1, so that the V-Ramp continues to charge the first electrode of the capacitor C1, and the voltage level at the first electrode of the capacitor C1 continue to raise. As discussed above, when the voltage level at the first electrode of the capacitor C1 increases, the current passing through the source and the drain of the second transistor M2 continues to raise, which leads to a change in the resistance of the photosensor 30. When the resistance of the photosensor 30 is within a range of reference resistance values (e.g., substantially the same as a reference value), the control voltage signal V1 becomes lower than a threshold voltage (e.g., substantially zero as shown in FIG. 7). At that time point, the first transistor M1 is turned off and the voltage level at the first electrode of the capacitor C1 is maintained at a stable level. The first angle α of the reflective surface of a micro mirror 20 with respect to the surface of the second side of the display panel 10 is maintained at a fixed angle until next cycle.

Referring to FIG. 3 and FIG. 4, in some embodiments the actuator 100 is an electromagnetic coil 40, and each of the plurality of micro light modulators M includes a magnet 50 attached to the micro mirror 20. A magnitude of a magnetic force between the electromagnetic coil 40 and the magnet 50 controls the first angle α.

In some embodiments, and referring to FIG. 3 and FIG. 4, each of the plurality of micro light modulators M further includes a hinge 60 coupled to the micro mirror 20. The micro mirror 20 is configured to rotate with respect to the hinge 60 in response to a change in the magnetic force thereby changing the first angle α.

In some embodiments, the display panel 10 is a transparent display panel. As used herein, the term "transparent display panel" refers to a display panel capable of permitting light incident from a back side of the display panel to pass through at the same time displaying a graphic image. Optionally, the transparent display panel in the context of the present disclosure has a transmittance of at least 20% or more. The transparent display panel according to the present disclosure include transparent liquid crystal display panels and transparent organic light emitting diode display panels. Examples of transparent display panels include transparent display panels in a form of a window in a room, a building, an appliance, car windshields, a vehicle head-up display, eye glasses, binoculars, visors, helmets, and so on.

In some embodiments, and referring to FIG. 3 and FIG. 4, each of the plurality of micro light modulators M further includes a light shield 70 attached to the micro mirror 20 on a side opposite to the reflective surface of the micro mirror 20. As discussed above, FIG. 4 illustrates an example in which the second light intensity of the second light L2 is relatively large. In a state as depicted in FIG. 4, the light shield 70 can shield a majority of ambient light from a back side of the display panel 10 when the display panel 10 is a transparent display panel. FIG. 3 illustrates an example in which the second light intensity of the second light L2 is relatively small. In a state as depicted in FIG. 3, the ambient light is shielded by the light shield 70 to a smaller extent. By having this design, the display contrast can be further enhanced.

Optionally, the display apparatus is a liquid crystal display apparatus. Optionally, the display apparatus is an organic light emitting diode display apparatus. Examples of appropriate display apparatuses include, but are not limited to, an electronic paper, a mobile phone, a tablet computer, a television, a monitor, a notebook computer, a digital album, a GPS, etc.

Figure 8:
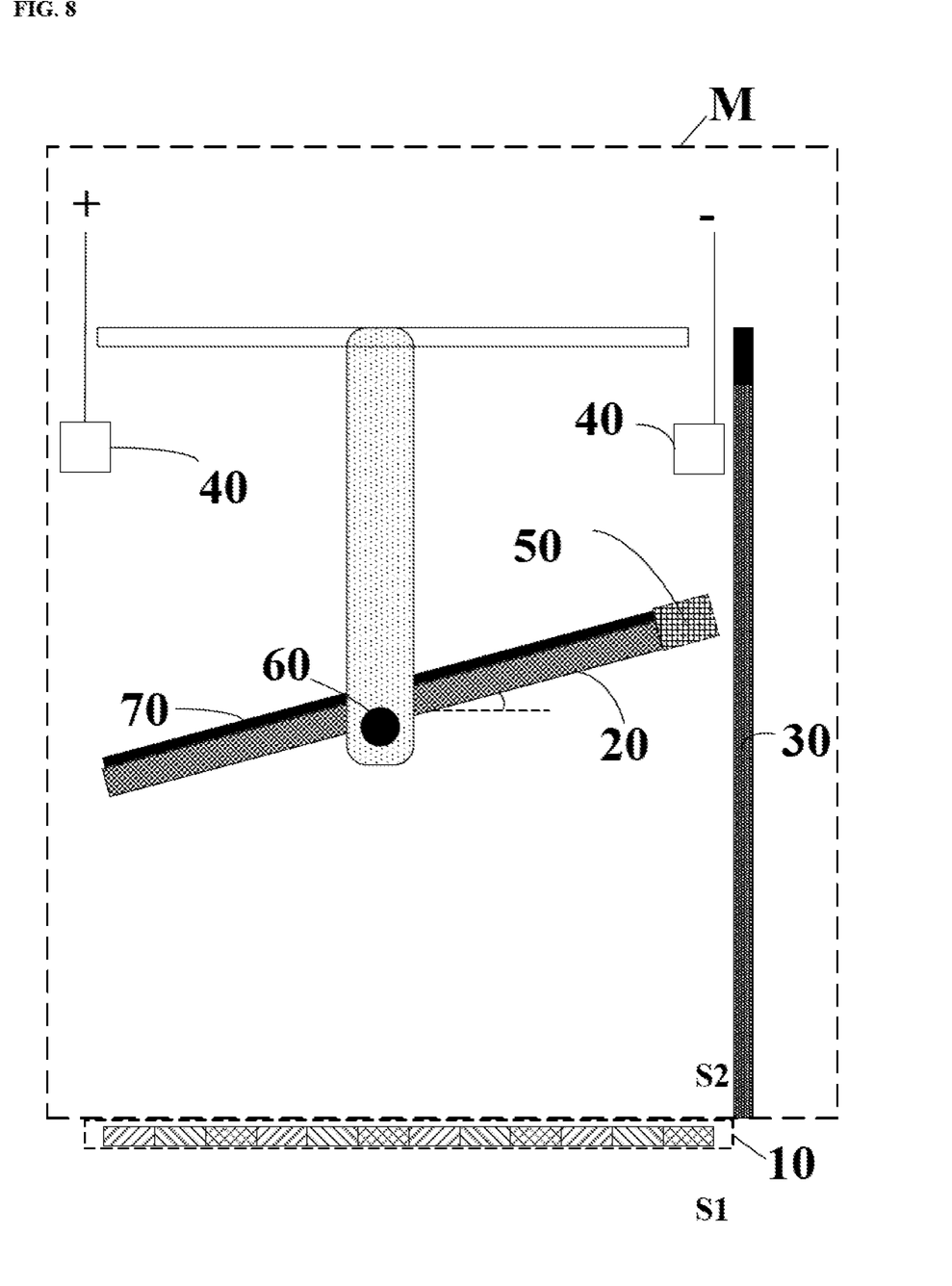
FIG. 8 is a schematic diagram illustrating one of the plurality of micro light modulators in a display apparatus in some embodiments according to the present disclosure.

Various alternative implementations of the present disclosure may be practiced. In one example, and as shown in FIG. 3 and FIG. 4, the electromagnetic coil 40 is attached to a rack for holding the micro mirror 20. FIG. 8 is a schematic diagram illustrating one of the plurality of micro light modulators in a display apparatus in some embodiments according to the present disclosure. Referring to FIG. 8, the electromagnetic coil 40 is not attached to the rack for holding the micro mirror 20, e.g., as a stand-alone unit. Optionally, the electromagnetic coil 40 is disposed approximately at a same level as the magnet 50. Similarly, the photosensor 30 may be disposed at any appropriate position in the display apparatus. In one example, the photosensor 30 is disposed in an inter-subpixel region of the display apparatus, e.g., in a region corresponding to a black matrix in the display apparatus.

In another aspect, the present disclosure provides an assembly for adaptively modulating display contrast of a display panel. In some embodiments, the apparatus includes an array of a plurality of micro light modulators. Optionally, each of the plurality of micro light modulators is configured to adaptively modulate a light intensity of light emitted out of a light emitting side of the display panel in a region corresponding to each of the plurality of micro light modulators based on a luminance level of a current image displayed in the region. For example, the region corresponding to each of the plurality of micro light modulators includes one or more of a plurality of subpixels in the display panel.

In some embodiments, the display panel has a first side distal to the array of a plurality of micro light modulators, and a second side opposite to the first side and proximal to the array of a plurality of micro light modulators. Optionally, each of the plurality of micro light modulators is configured to adaptively modulate a first light intensity of first light emitted out of the first side of the display panel in a region corresponding to each of the plurality of micro light modulators based on a second light intensity of second light emitted out of the second side of the display panel in the region corresponding to each of the plurality of micro light modulators. Optionally, the first light intensity positively correlates with the second light intensity. Optionally, each of the plurality of micro light modulators is configured to adaptively modulate the first light intensity of the first light by reflecting a first portion of the second light toward the second side thereby increasing the first light intensity. Optionally, each of the plurality of micro light modulators is configured to reflect a second portion of the second light along a direction away from the second side.

In some embodiments, the assembly for adaptively modulating display contrast of a display panel further includes an adaptive control circuit configured to adaptively adjust a ratio of the first portion to the second portion in response to a change in the second light intensity thereby adaptively modulating the first light intensity based on the second light intensity. Optionally, each of the plurality of micro light modulators further includes a photosensor configured to detect the second portion of the second light. A resistance of the photosensor undergoes a change in response to the change in the second light intensity. Optionally, the adaptive control circuit is configured to adaptively adjust the ratio of the first portion to the second portion in response to a change in the resistance of the photosensor.

In some embodiments, the assembly for adaptively modulating display contrast of a display panel further includes a plurality of first scan lines each of which coupled to a row of micro light modulators of the plurality of micro light modulators, a plurality of second scan lines each of which coupled to a column of micro light modulators of the plurality of micro light modulators; and a plurality of third thin film transistors each of which having a source coupled to one of the plurality of first scan lines, a gate coupled to one of the plurality of second scan lines, and a drain coupled to the photosensor in one of the plurality of micro light modulators. Optionally, the plurality of first scan lines are the same as a plurality of gate lines for driving image display in a plurality of subpixels in the display panel. Optionally, the plurality of second scan lines are the same as a plurality of gate lines for driving image display in a plurality of subpixels in the display panel.

Optionally, the adaptive control circuit includes a differential amplifier configured to generate a voltage control signal in response to the change in the resistance of the photosensor.

Optionally, the adaptive control circuit includes a first transistor having a gate coupled to the differential amplifier and a source configured to be provided with a repeating ramp voltage having a repetition frequency; a capacitor having a first node coupled to a drain of the first transistor; and a second transistor having a gate coupled to the first node of the capacitor, a source configured to be provided with a control voltage. Optionally, a voltage level maintained at the first node of the capacitor is configured to control a current passing through the source and a drain of the second transistor. Optionally, the repetition frequency is substantially the same as a frame frequency of image display in the display panel. Optionally, the voltage control signal is configured to turn off the first transistor so that the ramp voltage discontinues to charge the capacitor, when the resistance of the photosensor is within a range of reference resistance values.

In some embodiments, each of the plurality of micro light modulators includes a micro mirror. Optionally, the micro mirror has a reflective surface at a first angle with respect to a surface of the second side of the display panel. Optionally, the reflective surface is configured to reflect the first portion of the second light toward the second side and the second portion of the second light along a direction away from the second side; and the adaptive control circuit is configured to control the first angle to adaptively adjust a ratio of the first portion to the second portion in response to a change in the second light intensity thereby adaptively modulating the first light intensity based on the second light intensity.

In some embodiments, each of the plurality of micro light modulators further includes an actuator configured to control the first angle of the reflective surface with respect to the surface of the second side of the display panel. Optionally, the actuator is coupled to the drain of the second transistor. Optionally, the actuator is an electromagnetic coil, and each of the plurality of micro light modulators M includes a magnet attached to the micro mirror. Optionally, a magnitude of a magnetic force between the electromagnetic coil and the magnet controls the first angle.

Optionally, each of the plurality of micro light modulators further includes a hinge coupled to the micro mirror. Optionally, the micro mirror is configured to rotate with respect to the hinge in response to a change in the magnetic force thereby changing the first angle.

In another aspect, the present disclosure provides a method of adaptively modulating display contrast of a display panel. In some embodiments, the method includes adaptively modulating a light intensity of light emitted out of a light emitting side of the display panel in a region corresponding to each of the plurality of micro light modulators based on a luminance level of a current image displayed in the region.

In some embodiments, the display panel has a first side and a second side opposite to the first side, the first side being a light emitting side of the display panel. Optionally, the method includes adaptively modulating a first light intensity of first light emitted out of the first side of the display panel in a defined region based on a second light intensity of second light emitted out of the second side of the display panel in the defined region. Optionally, the first light intensity positively correlates with the second light intensity as a result of the adaptive modulation.

Optionally, the method includes adaptively modulating the first light intensity of the first light by reflecting a first portion of the second light toward the second side thereby increasing the first light intensity. Optionally, the method further includes reflecting a second portion of the second light along a direction away from the second side.

In some embodiments, the method further includes adaptively adjusting a ratio of the first portion to the second portion in response to a change in the second light intensity thereby adaptively modulating the first light intensity based on the second light intensity. Optionally, the method further includes detecting the second portion of the second light using a photosensor. A resistance of the photosensor undergoes a change in response to the change in the second light intensity. Optionally, the method includes adaptively adjusting the ratio of the first portion to the second portion in response to a change in the resistance of the photosensor.

Optionally, the method further includes generating a voltage control signal in response to the change in the resistance of the photosensor using a differential amplifier.

Optionally, the method further includes adaptively adjusting a ratio of the first portion to the second portion in response to a change in the second light intensity thereby adaptively modulating the first light intensity based on the second light intensity.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A display apparatus, comprising:
a display panel having a plurality of subpixels; and
an array of a plurality of micro light modulators on the display panel and configured to adaptively modulate display contrast of the display apparatus;
wherein each of the plurality of micro light modulators is configured to adaptively modulate a light intensity of light emitted out of a light emitting side of the display panel in a region corresponding to each of the plurality of micro light modulators based on a luminance level of a current image displayed in the region;
the display panel has a first side distal to the array of a plurality of micro light modulators, and a second side opposite to the first side and proximal to the array of a plurality of micro light modulators; and
each of the plurality of micro light modulators is configured to adaptively modulate a first light intensity of first light emitted out of the first side of the display panel in a region corresponding to each of the plurality of micro light modulators based on a second light intensity of second light emitted out of the second side of the display panel in the region corresponding to each of the plurality of micro light modulators.

2. The display apparatus of claim 1, wherein the region corresponding to each of the plurality of micro light modulators comprises one or more of the plurality of subpixels.

3. The display apparatus of claim 1, wherein the first light intensity positively correlates with the second light intensity.

4. The display apparatus of claim 1, wherein each of the plurality of micro light modulators is configured to adaptively modulate the first light intensity of the first light by reflecting a first portion of the second light toward the second side thereby increasing the first light intensity.

5. The display apparatus of claim 4, wherein each of the plurality of micro light modulators is configured to reflect a second portion of the second light along a direction away from the second side.

6. The display apparatus of claim 5, further comprising an adaptive control circuit configured to adaptively adjust a ratio of the first portion to the second portion in response to a change in the second light intensity thereby adaptively modulating the first light intensity based on the second light intensity.

7. The display apparatus of claim 6, wherein each of the plurality of micro light modulators further comprises a photosensor configured to detect the second portion of the second light.

8. The display apparatus of claim 7, wherein a resistance of the photosensor undergoes a change in response to the change in the second light intensity; and
the adaptive control circuit is configured to adaptively adjust the ratio of the first portion to the second portion in response to a change in the resistance of the photosensor.

9. The display apparatus of claim 7, further comprising a plurality of first scan lines each of which coupled to a row of micro light modulators of the plurality of micro light modulators;
a plurality of second scan lines each of which coupled to a column of micro light modulators of the plurality of micro light modulators; and
a plurality of switch transistors each of which having a source coupled to one of the plurality of first scan lines, a gate coupled to one of the plurality of second scan lines, and a drain coupled to the photosensor in one of the plurality of micro light modulators.

10. The display apparatus of claim 7, wherein the adaptive control circuit comprises a differential amplifier configured to generate a voltage control signal in response to the change in a resistance of the photosensor.

11. The display apparatus of claim 10, wherein the adaptive control circuit further comprises:
a first transistor having a gate coupled to the differential amplifier and a source configured to be provided with a ramp voltage having a repetition frequency;
a capacitor having a first electrode coupled to a drain of the first transistor; and
a second transistor having a gate coupled to the first electrode of the capacitor, a source configured to be provided with a control voltage;
wherein a voltage level maintained at the first electrode of the capacitor is configured to control a current passing through the source and a drain of the second transistor.

12. The display apparatus of claim 11, wherein the voltage control signal is configured to turn off the first transistor so that the ramp voltage discontinues to charge the capacitor, when the resistance of the photosensor is within a range of reference resistance values.

13. The display apparatus of claim 1, wherein each of the plurality of micro light modulators comprises a micro mirror;
the micro mirror has a reflective surface at a first angle with respect to a surface of the second side of the display panel;
the reflective surface is configured to reflect a first portion of the second light toward the second side and a second portion of the second light along a direction away from the second side; and
the display apparatus further comprises an adaptive control circuit configured to control the first angle to adaptively adjust a ratio of the first portion to the second portion in response to a change in the second light intensity thereby adaptively modulating the first light intensity based on the second light intensity.

14. The display apparatus of claim 13, wherein each of the plurality of micro light modulators further comprises an actuator configured to control the first angle of the reflective surface with respect to the surface of the second side of the display panel.

15. The display apparatus of claim 14, wherein the actuator is an electromagnetic coil; and
each of the plurality of micro light modulators includes a magnet attached to the micro mirror;
wherein a magnitude of a magnetic force between the electromagnetic coil and the magnet controls the first angle.

16. The display apparatus of claim 13, wherein each of the plurality of micro light modulators further comprises a hinge coupled to the micro mirror; and
the micro mirror is configured to rotate with respect to the hinge in response to a change in the magnetic force thereby changing the first angle.

17. The display apparatus of claim 1, wherein the display panel is a transparent display panel.

18. An assembly for adaptively modulating display contrast of a display panel, comprising an array of a plurality of micro light modulators;
wherein each of the plurality of micro light modulators is configured to adaptively modulate a light intensity of light emitted out of a light emitting side of the display panel in a region corresponding to each of the plurality of micro light modulators based on a luminance level of a current image displayed in the region;
wherein the display panel has a first side distal to the array of a plurality of micro light modulators, and a second side opposite to the first side and proximal to the array of a plurality of micro light modulators; and
each of the plurality of micro light modulators is configured to adaptively modulate a first light intensity of first light emitted out of the first side of the display panel in a region corresponding to each of the plurality of micro light modulators based on a second light intensity of second light emitted out of the second side of the display panel in the region corresponding to each of the plurality of micro light modulators.

19. A method of adaptively modulating display contrast of a display panel, comprising adaptively modulating a light intensity of light emitted out of a light emitting side of the display panel in a region corresponding to each of a plurality of micro light modulators based on a luminance level of a current image displayed in the region;
wherein the display panel has a first side distal to the array of a plurality of micro light modulators, and a second side opposite to the first side and proximal to the array of a plurality of micro light modulators; and wherein the method further comprises adaptively modulating a first light intensity of a first light emitted out of the first side of the display panel in a region corresponding to each of the plurality of micro light modulators based on a second light intensity of second light emitted out of the second side of the display panel in the region corresponding to each of the plurality of micro light modulators.

* * * * *